United States Patent
Weigert et al.

(10) Patent No.: US 12,338,562 B2
(45) Date of Patent: Jun. 24, 2025

(54) SYSTEM AND METHOD FOR PRODUCING A SINGLE- OR MULTI-LAYER NONWOVEN

(71) Applicants: TRÜTZSCHLER GMBH & CO. KG, Mönchengladbach (DE); VOITH PATENT GMBH, Heidenheim (DE)

(72) Inventors: Thomas Weigert, Sulzbach (DE); Kai Pöhler, Vettweiss (DE); Ralf Schröder, Langen (DE); Andreas Schilz, Aachen (DE)

(73) Assignees: TRÜTZSCHLER GROUP SE, Mönchengladbach (DE); VOITH PATENT GMBH, Heidenheim (DE)

( * ) Notice: Subject to any disclaimer, the term of this patent is extended or adjusted under 35 U.S.C. 154(b) by 149 days.

(21) Appl. No.: 18/017,428

(22) PCT Filed: Apr. 20, 2021

(86) PCT No.: PCT/EP2021/060233
§ 371 (c)(1),
(2) Date: Jan. 23, 2023

(87) PCT Pub. No.: WO2021/228514
PCT Pub. Date: Nov. 18, 2021

(65) Prior Publication Data
US 2023/0304200 A1    Sep. 28, 2023

(30) Foreign Application Priority Data
May 14, 2020    (DE) .................. 10 2020 113 137.2

(51) Int. Cl.
*D04H 1/498*    (2012.01)
*D04H 1/732*    (2012.01)

(52) U.S. Cl.
CPC ............. *D04H 1/498* (2013.01); *D04H 1/732* (2013.01)

(58) Field of Classification Search
CPC ........ D04H 1/492; D04H 1/498; D04H 18/04; D04H 1/4374; D04H 1/465; D04H 1/49;
(Continued)

(56) References Cited

U.S. PATENT DOCUMENTS 3,291,682 A    12/1966    Hellstrom
4,443,297 A *   4/1984    Cheshire ............... D21F 11/002
                                                        162/190
(Continued)

FOREIGN PATENT DOCUMENTS

EP    1748101 A2    1/2007
EP    0992338 B1    8/2007
(Continued)

OTHER PUBLICATIONS

English translation of SE 455000 (Doc pub. Jun. 1988) (Year: 1988).*
(Continued)

*Primary Examiner* — Amy Vanatta
(74) *Attorney, Agent, or Firm* — FisherBroyles, LLP; Robert Kinberg (57) ABSTRACT

The invention relates to an installation and to a method of producing a web, wherein the installation includes a device for producing a layer of wet laid fibres, which has an entangling device and at least one dryer disposed downstream in material transport direction. The device for producing the wet laid fibres is formed as a cylinder mould former.

11 Claims, 7 Drawing Sheets

(58) Field of Classification Search
CPC ............ D04H 5/03; D04H 1/732; D04H 1/76;
D04H 1/70; D04H 1/736; D04H 1/46;
D04H 5/08; D04H 5/10; D04H 13/003;
D04H 18/00; D21F 1/04; D21F 1/046;
D21F 9/04; D21F 11/06; D21F 1/48;
D21F 1/52; D21F 1/526; D21F 2/00;
D21F 3/0272; D21F 3/04; D21F 9/046;
B32B 2250/20; B32B 2307/718; B32B
5/022; B32B 5/067; B32B 5/26; B32B
5/266

See application file for complete search history.

(56) References Cited

U.S. PATENT DOCUMENTS

| | | | | |
|---|---|---|---|---|
| 6,058,583 A * | 5/2000 | Takeuchi | ............ | D21F 9/00 28/104 |
| 6,110,848 A * | 8/2000 | Bouchette | ............ | D04H 1/732 442/389 |
| 6,163,943 A * | 12/2000 | Johansson | ............ | D04H 1/4374 28/104 |
| 2002/0088592 A1* | 7/2002 | Drew | ............ | D21F 11/006 162/298 |
| 2002/0157766 A1 | 10/2002 | Vuillaume et al. | | |
| 2003/0106195 A1* | 6/2003 | Fleissner | ............ | D04H 13/00 28/104 |
| 2005/0102801 A1* | 5/2005 | Schmidt | ............ | D04H 1/498 19/215 |
| 2005/0148261 A1* | 7/2005 | Close | ............ | D04H 5/06 442/381 |
| 2007/0022586 A1* | 2/2007 | Sommer | ............ | D04H 13/00 28/104 |
| 2018/0112339 A1* | 4/2018 | Weigert | ............ | D04H 18/04 |
| 2023/0340709 A1* | 10/2023 | Vomhof | ............ | D04H 1/732 |

FOREIGN PATENT DOCUMENTS

| | | | | |
|---|---|---|---|---|
| EP | 1905877 A2 | 4/2008 | | |
| SE | 455000 B * | 6/1988 | ............ | D21F 1/04 |
| WO | 9634136 A1 | 10/1996 | | |
| WO | 9922059 A1 | 5/1999 | | |
| WO | 0153588 A2 | 7/2001 | | |
| WO | WO-2004067837 A1 * | 8/2004 | ............ | D21F 1/02 |
| WO | 2009130174 A1 | 10/2009 | | |
| WO | 2012150902 A1 | 11/2012 | | |

OTHER PUBLICATIONS

English translation of WO 2004067837 (Doc pub Aug. 2004 (Year: 2004).*

International Search Report in corresponding International Patent Application No. PCT/EP2021/060233, mailed Jul. 22, 2021, 8 pages.

* cited by examiner

SYSTEM AND METHOD FOR PRODUCING A SINGLE- OR MULTI-LAYER NONWOVEN

CROSS-REFERENCE TO RELATED APPLICATIONS

This application is a United States National Stage Application of International Application No. PCT/EP2021/060233 filed Apr. 20, 2021, claiming priority from German Patent Application No. 10 2020 113 137.2 filed May 14, 2020.

DESCRIPTION

The invention relates to an installation and to a method for producing a single-layer or multilayer web.

According to the state-of-the-art, it is known to dispose a loose layer of fibres, such a pulp, between two carded webs, and to entangle it by means of water jets. An installation and a method of said type is described for example in the EP 0 992 338 B1. The loose layer of fibres can be produced and deposited by means of a wet laid method, meltblown or air laid. Disadvantageous is the poor strength of the multilayer web, which, after hydroentangling, almost exclusively relies on the strength of the carded web. Another disadvantage of the air laid method is that fibres of different lengths or different composition cannot be processed.

Applying short fibres by means of air laid is disadvantageous in that the short fibres can only be water jet needled at increased expense, e.g. by means of a binding agent, so that a biodegradable product can only be produced at high expense. Using an inclined wire former for producing a wet laid layer of short fibres requires a lot of construction space, has a high water consumption and is very expensive in terms of investment.

SUMMARY OF THE INVENTION

Accordingly, an object of the invention is to further develop an installation and a method for producing a single-layer or a multilayer web in that the installation can be formed in a space-saving manner and operated cost-effectively. Furthermore, the installation is to be formed for producing a single-layer or a multilayer web, which preferably is biodegradable.

The inventive installation for producing a multilayer web comprises at least one device for producing and/or depositing a first web on a circulating belt, wherein, following in material transport direction, a device is disposed, which is formed for applying a layer of wet laid fibres on the first web. Downstream in material transport direction is provided a device for entangling and/or bonding the first web to the layer of wet laid fibres, wherein the distance I is 10 m maximum between the points of depositing the first web on the circulating belt and the point of depositing the layer of wet laid fibres on the first web. The inventive installation is built very short and can be purchased with little investment cost and operated at a low operating cost.

In a three-layer web, the installation comprises at least one device for producing and/or depositing a first web on a circulating belt, wherein, following in material transport direction, a further device is disposed for producing and/or depositing a further web on a circulating belt. Between said two devices is disposed a device for producing a layer of wet laid fibres, which are deposited between the first web and the further web on a circulating belt. According to this embodiment of the invention, a distance L is 25 m maximum between the point of depositing the first web on the circulating belt and the point of depositing the second web on the layer of wet laid fibres.

Preferably, the devices for producing the first web and/or the second web are formed as roller cards, wherein the webs of the roller cards can be applied on the circulating belt and/or on the layer of wet laid fibres.

As an alternative, the devices for producing the first web and/or the second web can be formed as a spunbond installation, wherein the webs of endless fibres can be applied on the circulating belt and/or on the layer of wet laid fibres.

As an alternative embodiment, a device for producing the first web and/or the second web is formed as an unwind station, which can apply the web on the circulating belt and/or on the layer of wet laid fibres. The web of the unwind stations can consist of a carded web, of a pre-manufactured web of an optional fibre blend, of a web of endless filaments or of staple fibres.

Likewise, optional combinations are possible of the device for producing a layer of wet laid fibres with a roller card, an unwind station and/or a spunbond installation.

Preferably, the device for producing the wet laid fibres is formed as a cylinder mould former, which, as a compact device, can be incorporated between one or two roller card/s and/or between one or two spunbond installation/s and/or between one or two unwind station/s or can consist of a combination of the three variants. As a result, the installation has a very short construction length, which also can be incorporated later into existing installations. In particular, in an underfloor solution of the cylinder mould former, the construction space can be further shortened, because the interfaces of the circulating belts for transferring the wet laid fibres and/or webs are easily realized.

According to a further aspect of the invention, the installation for producing a web may include a device for producing a layer of wet laid fibres, which, in material transport direction, has a downstream entangling device and at least one dryer. The the device for producing the wet laid fibres may be formed as a cylinder mould former. The cylinder mould former is advantageous in that the layer of wet laid fibres can be manufactured in a very compact construction space with two smoothed sides (top and wire sides). No further following belts, rolls or smoothing devices are necessary outside the cylinder mould former so that the layer of wet laid fibres on its own or in combination with one or more web/s can be bonded and further processed. Distributing the fibres, in particular at low weights per unit area of 10 to 50 $g/m^2$ across a width of up to 5 m is very uniform, which cannot be achieved with an air laid installation.

The invention relates to an installation and to a method of producing a web, wherein the installation includes a device for producing a layer of wet laid fibres, which has an entangling device and at least one dryer disposed downstream in material transport direction. The device for producing the wet laid fibres is formed as a cylinder mould former.

In contrast to the traditional inclined wire former, using the cylinder mould former is advantageous in that it is compact and less expensive, uses less water and the entire installation with pumps, pipelines etc. is smaller and more compact and can be operated considerably cheaper.

Compared to an air laid installation, the cylinder mould former is advantageous in that the wet laid fibres can be further processed with two smooth or planar surfaces, which are smoothed by the cylinder on the wire side and, for example, by the belt, a stripper device or a roll on the top side of the wet laid fibres. Based on the smoothed surfaces, in particular with the light and thin wet laid fibres, is achieved a very uniform material distribution or a very uniform weight per unit area, which cannot be achieved with other methods (air laid, meltblown). Particularly advantageous is the use of the cylinder mould former with thin and light layers of wet laid fibres with a weight per unit area of 10 to 50 g/m², in which a non-uniform thickness has a particular strong effect. In particular when processing pulp fibres, said uniformity cannot be achieved with an air laid installation. When compared to the air laid or meltblown installation, another advantage of the cylinder mould former is the high number of fibres or fibre blends to be processed with regard to length and fibre type, because in particular the use of secondary fibres, recycled fibres or regenerated fibres is advantageous for producing a biodegradable web, which an air laid installation cannot process.

According to the inventive method for producing a web, a fibre suspension is deposited on a rotating cylinder, which is formed for drawing off at least a portion of the liquid of the fibre suspension so as to create a layer of wet laid fibres, which, on the top side, is taken by means of a circulating belt and transferred to another circulating belt, wherein the layer of wet laid fibres is bonded and dried. The inventive method allows for producing a very thin and light layer of wet laid fibres, which is particularly uniform with regard to weight per unit area and material distribution, because, due to the production process, both sides (top side, wire side) are delivered in a smoothed manner from the cylinder mould former. Without further processing, the layer of wet laid fibres on its own or in combination with one or more web/s can be bonded and/or dried.

In particular, the method is suitable for very short fibres (1 to 3 mm, preferably 1 to 12 mm average fibre length), which are biodegradable. At a speed of up to 400 m/min, the inventive method is able to produce thin layers of wet laid fibres having a width of up to 5 m, which have a very uniform weight per unit area.

BRIEF DESCRIPTION OF THE DRAWINGS

Further measures enhancing the invention are illustrated in more detail in the following in conjunction with the description of a preferred exemplary embodiment of the invention based on the Figures, wherein.

DETAILED DESCRIPTION

Figure 1:
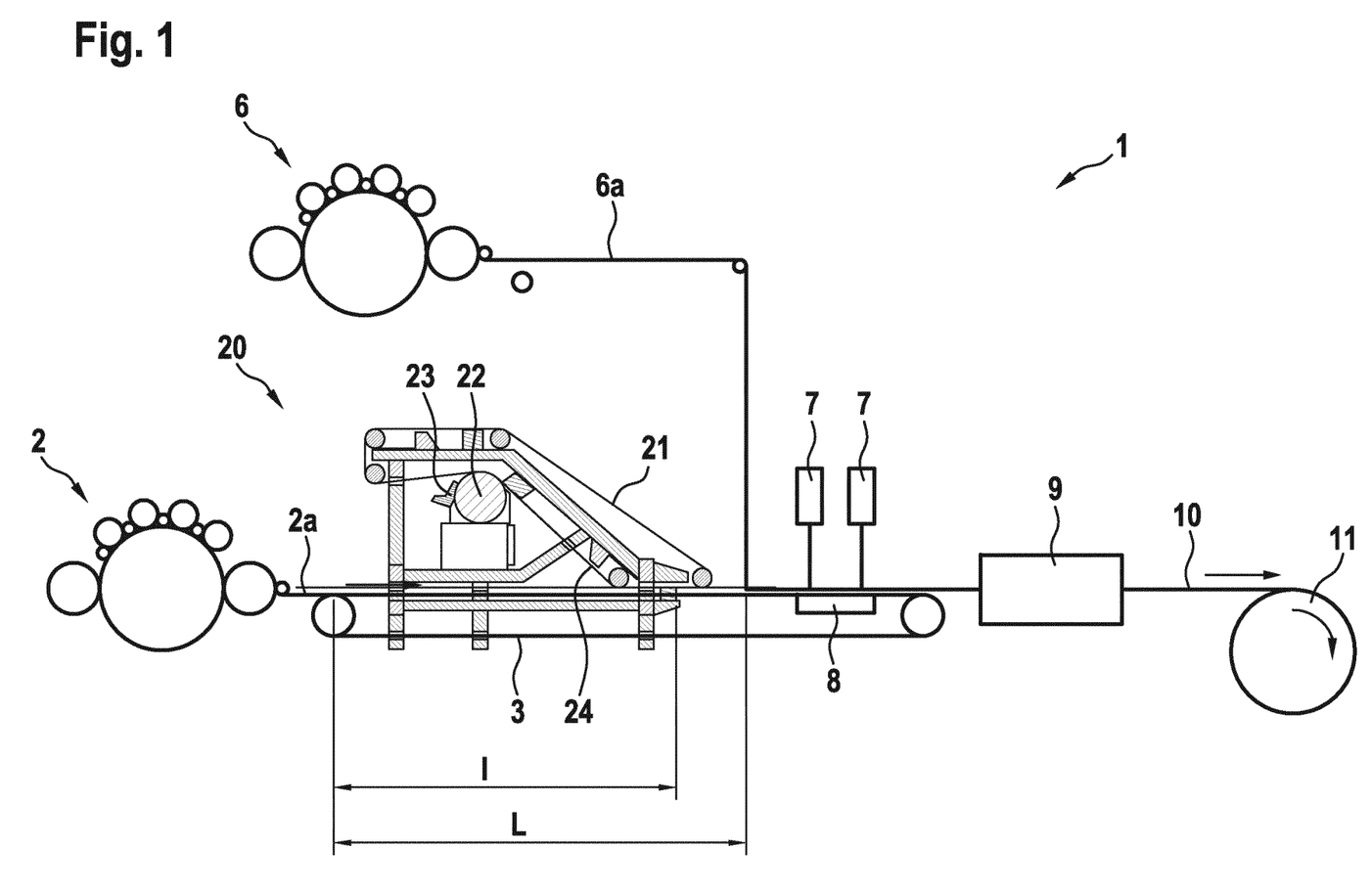
FIG. 1: a first exemplary embodiment of an inventive installation.

FIG. 1 shows an installation 1, in which a first roller card 2 deposits a carded web 2a on a circulating belt 3. The carded web 2a can consist of fibres from viscose, for example with 1.7 denier and 40 mm fibre length. Following thereto is disposed a cylinder mould former 20, which is formed for making a layer of wet laid fibres 24. In transport direction, another roller card 6, which is likewise formed for producing a carded web 6a, can be disposed downstream the cylinder mould former 20. Following in transport direction, are disposed at least one hydroentangling 7 and a dryer 9. The installation 1 is formed for variably producing only a layer of wet laid fibres 24, a web 2a with a layer of wet laid fibres 24 or a web 2a with a layer of wet laid fibres 24 and a further web 6a.

A cylinder mould former 20 makes a layer of wet laid fibres 24 and deposits the same on a circulating belt 3. For this purpose, the cylinder mould former 20 has a headbox 23, by means of which a pipeline deposits a fibre suspension, for example from pulp, on a driven rotating cylinder 22. Preferably, the rotating cylinder 22 can have a perforated envelope with a plurality of holes and can have an inside suction. A stationary suction device in the rotating cylinder 22 can draw off most of the water from the fibre suspension. Thereby, the wet fibres 24, which were deposited on the cylinder 22, are transported with the top side thereof by a circulating belt 21, which preferably can be formed as a perforated belt. The top side of the wet fibres 24 is maintained by a side of the belt 21 and transported away, which, in this exemplary embodiment, is directed downwards and thereby deposits the wet fibres 24 through gravity on the circulating belt 3. The result is a single-layer web, which can be fed to further processing in an entangled, dried and wound-up manner. Preferably, prior to entangling, the layer of wet laid fibres 24 can be treated with a binding agent.

Preferably, the installation 1 includes at least one device for producing a carded web, which, in transport direction, is disposed upstream the cylinder mould former 20. The device can be formed as a roller card 2. In this case, the layer of wet laid fibres 24 is deposited on the web 2a of the roller card 2. Thus, creating a two-layered web, comprising a layer of carded web 2a with a layer of wet laid fibres 24, which are entangled with each other, dried and further processed as a web 10 or are wound up by means of a winder 11.

Optionally, another roller card 6 can cover the wet laid fibres 24 with a further carded web 6a, so that the wet laid fibres 24 are chambered on both sides by a web 2a, 6a. Likewise, the carded web 6a can consist of viscose having 1.7 denier and 40 mm fibre length, for example. In the following, the three layers can be entangled with each other, dried and, as a web 10, further processed or wound up by means of a winder 11. The illustration of the roller card 6 above the cylinder mould former is just diagrammatically illustrated. Actually, the installation components 2, 20 and 6 are disposed in transport direction following each other. Also, the illustration of depositing the webs 2a, 6a on one or more circulating belts 3 is only diagrammatically illustrated. Usually, depositing the carded webs from the roller card is realized at a slight angle from above the one or more transport belt/s. The circulating belt 3 does not limit the number of circulating belts, which deposit the wet laid fibres 24 and/or carded webs 2a, 6a. Also, several circulating belts can be used.

All three variants have in common, that the hydroentangling 7 can be operable in single stage or multistage at a pressure of 40 to 400 bars, wherein a suction device 8 can be disposed underneath the circulating belt 3, which suctions off the water of the hydroentangling 7. Subsequently, the entangled multilayer web passes a dryer 9, which can be formed as a drum dryer or belt dryer. After drying, the single-layer or multilayer web 10 can be wound on a winder 11. An advantage of the inventive installation 1 is the low space requirement for producing a single-layer or multilayer web, the uniform distribution of the wet laid fibres 24 across the width of the emerging web, and the potential use of secondary fibres, regenerated fibres and/or recycled fibres so as to be able to produce a biodegradable web. Another advantage is found in that the installation can be operated with only one layer of wet laid fibres 24, or with two layers (2a and 24) or (24 and 6a) or with three layers (2a and 24 and 6a) of fibres or webs, and the compactness and low investment cost allow for a very affordable operation.

The distance L amounts to 25 m maximum between the points of depositing, at which the webs 2a and 6a are placed on one or more belt/s 3, and between which the layer of wet laid fibres 24 is applied. The distance I amounts to 10 m maximum between the point of depositing a web 2a on one or more belt/s 3 and the following point in transport direction, at which the wet laid fibres 24 are placed on the web 2a. Thus, creating a short and compact installation, which cannot be achieved when using a traditional inclined wire former.

Figures 2, 2A:
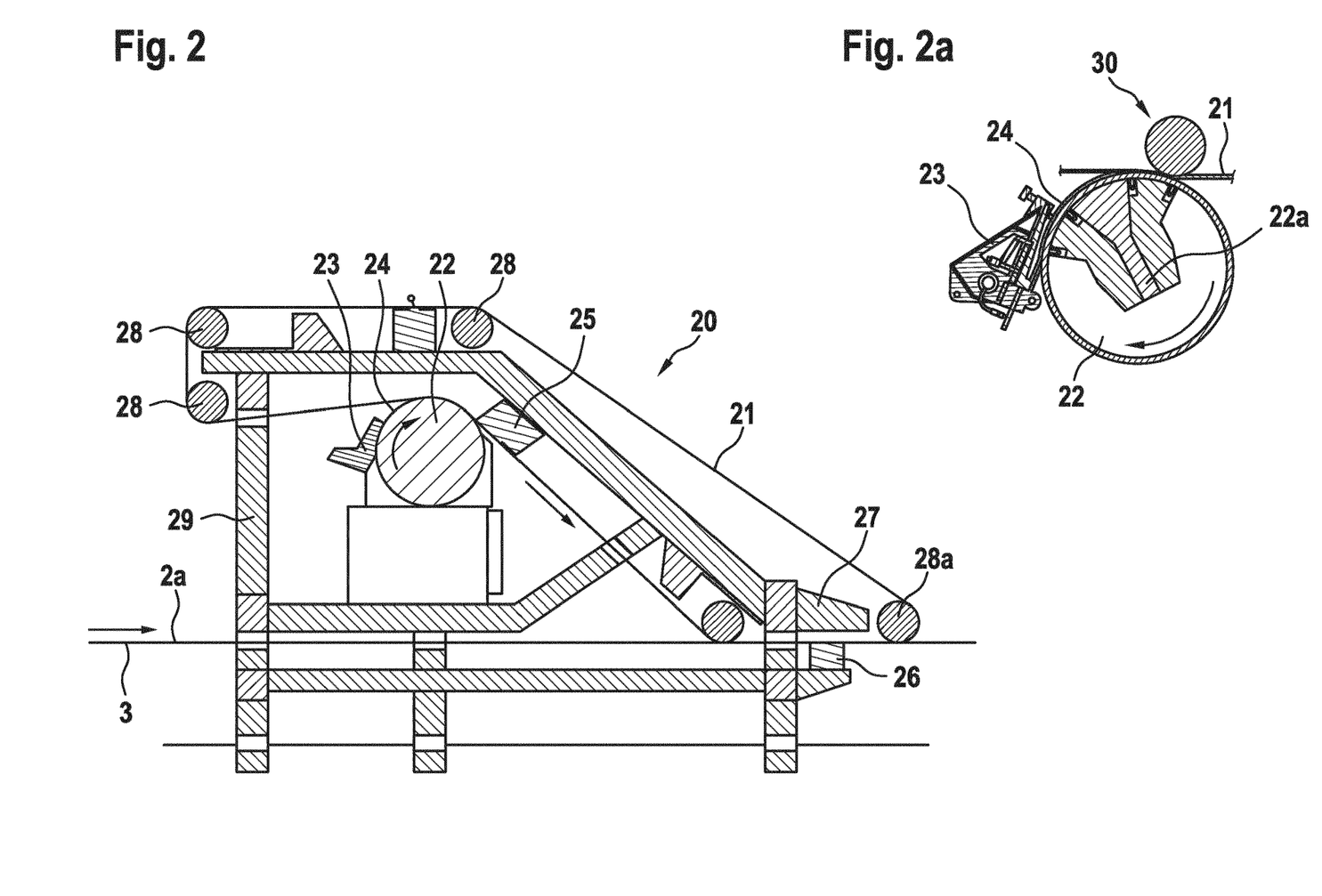
FIG. 2: an enlarged illustration of the cylinder mould former.
FIG. 2a: an enlarged illustration on the cylinder of a cylinder mould former.

FIG. 2 shows an enlarged illustration of a first embodiment of the cylinder mould former 20, in which a headbox 23 deposits a fibre suspension on a driven rotating cylinder 22. Preferably, the cylinder 22 can have a perforated jacket and thereby evacuate the water of the fibre suspension. For this purpose, the entire cylinder 22 can be at slight negative pressure and have a drain for the evacuated water. Complementarily, the cylinder 22 can be suctioned at least in the partial area on the circumference, on which the belt 21 rests, which is described in more detail in the embodiment of FIG. 2a. As an alternative, a non-illustrated suction can be disposed above the cylinder 22, which suctions off the water of the fibre suspension through the circulating belt 21. Preferably, suctioning can be varied in intensity segment-wise inside and/or outside the cylinder 22 over a partial area. The cylinder 22 or the circulating belt 21 can cooperate with one or more non-illustrated couch roll/s, which ensure further removal of water and compacting of the wet laid fibres 24. The circulating belt 21, which can be formed as a perforated belt, is guided around several deflection rollers 28 and, with an outer side, rests on a partial circumference of the cylinder 22 with tension, so that the water is pressed out of the fibre suspension. At least one deflection roller 28 can be embodied as a tensioner roller, which is able to tension the circulating belt 21. Preferably, the cylinder 22 and the belt 21 rotate or move at the same speed. A doffer 25 can be disposed on the inside of the belt 21 in the area where the belt 21 detaches from the cylinder 22. The doffer 25 can be formed as a suction chamber so that, at negative pressure, the fibres 24 remain at the belt 21 and are doffed off of the cylinder 22. Thereby, the fibres 24 are transported upside-down with the top side thereof from the belt 21 in the direction circulating belt 3, on which in turn the web 2a can rest. In the area of the transfer of the fibres 24 to the web 2a, at the cylinder mould former 20 can be disposed a suction separator 26, which detaches the fibres from the belt 21 by means of suction air. In this case, the suction separator 26 is disposed underneath the circulating belt 3 and can—if present—simultaneously blow air through the web 2a. A pressure device 27 can be disposed on the opposite side of the belt 21, namely on the inside of the belt 21, for increasing the detaching effect of the fibres 24 from the belt 21, which device detaches the fibres 24 from the belt 21 by means of air or water pressure. Preferably, a deflection roller 28a is formed for being adjusted in position so that an open angle is created in the transfer area of the wet laid fibres 24 onto the web 2a between the belts 3 and 21 in transport direction, which angle assists in detaching the wet laid fibres 24 from the belt 21.

Optimizing the quality of the wet laid fibres 24 can be achieved at the headbox 23 by means of a dilution water regulator, whereby the transverse profile of the wet laid fibres 24 can be even more harmonized. For a working width of the installation of up to 5 m, in particular for a thin and light layer of wet laid fibres, the cross-section can be harmonized thereby. Another improvement can be achieved with a headbox heating, which likewise can further improve the cross-sectional profile of the wet laid fibres 24. A lateral suctioning allows for creating the border of the wet laid fibres with sharper edges.

The cylinder mould former 20 is mounted to a rack 29, which can be disposed optionally in the area of a feed of further fibres or of a web 2a above a belt 3. Depending on the embodiment of the cylinder mould former, a modified belt guide can deposit the layer of wet laid fibres also with the wire side on another transport belt, which follows the circulating belt 21.

In the embodiment of FIG. 2a, at least a partial area on the circumference of the cylinder 22 is suctioned, on which the wet laid fibres 24 are transferred from the headbox 23 to the rotating cylinder and then the fibres are taken over from the belt 21. In this exemplary embodiment, the suction 22a is stationarily disposed within the cylinder 22 and embodied in multiple stages, which can have a central middle suction and, on both sides disposed next thereto, one respective suction with reduced suction capacity.

Thereby, the cylinder 22 rotates about the stationary suction 22a. Alternatives are possible, for example a stepwise suction, which, on the circumference of the cylinder, can continually or stepwise decrease from the headbox 23 to the transfer onto the belt 21. A couch roll 30 above the belt 21 compacts the wet laid fibres 24 and increases the dryness of the fibres 24. As an alternative, instead of the couch roll 30, also a suction device, not illustrated in detail, could be disposed overhead above the belt 21 in the area, at which the wet laid fibres 24 are transferred from the cylinder 22 to the belt 21.

Figure 3:
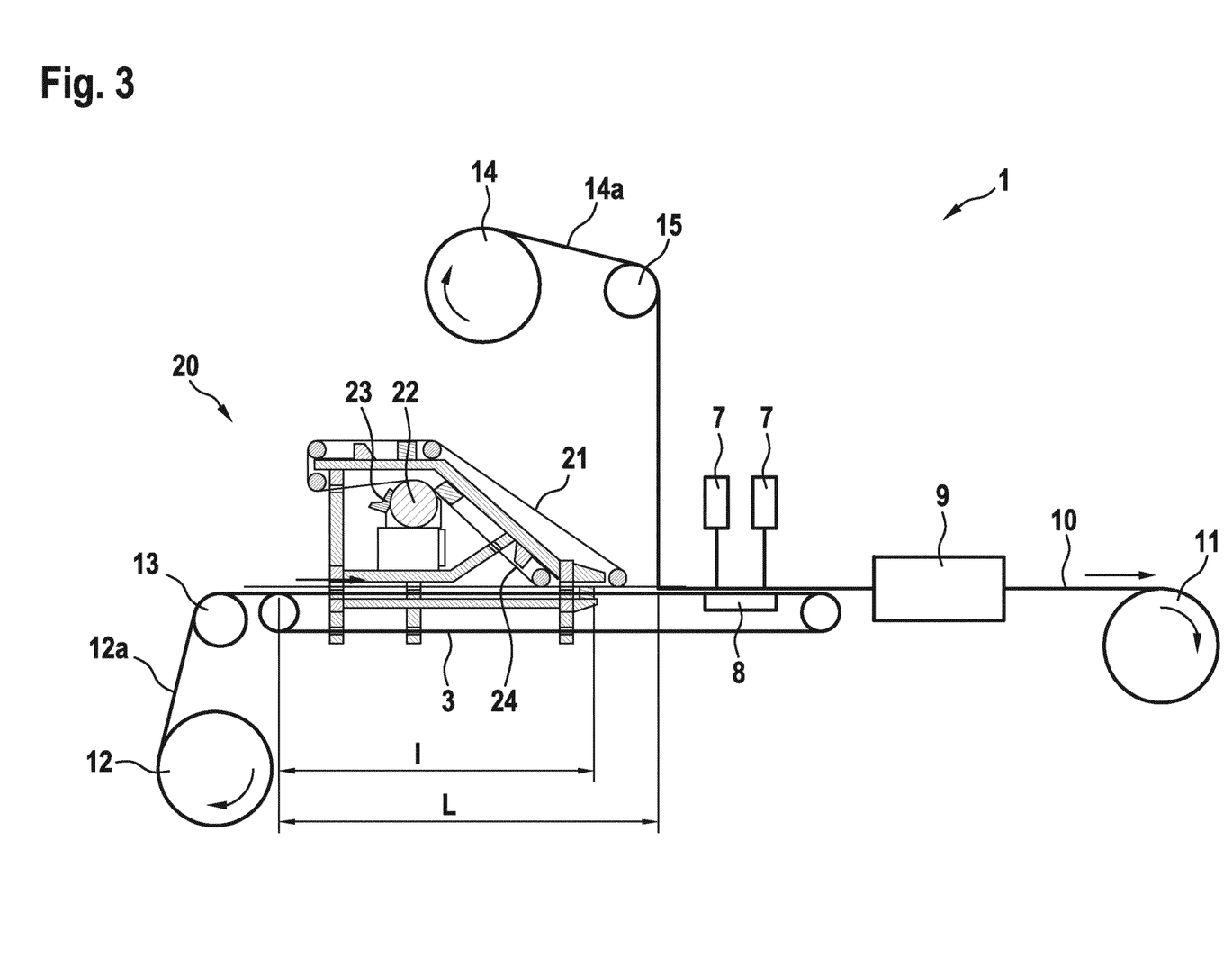
FIG. 3: another exemplary embodiment of an inventive installation.

FIG. 3 shows an alternative embodiment, in which, instead of the roller card 2 and/or 6 of FIG. 1, also one or two webs 12a, 14a, which are unwound from one respective unwind station 12, 14 over a deflection roller 13, 15, could be introduced into the installation 1. For example, the web 12a, 14a can have a respective weight per unit area of 15 g/m$^2$. For a pulp quantity of 20 g/m$^2$, which the cylinder mould former 20 processes, is achieved a light multilayer web 10 of altogether 50 g/m$^2$ after the dryer 9. Preferably, the web 10 can be used as a biodegradable product for hygienics or cosmetics. As an alternative, the fibres of the web 12a, 14a can consist of lyocell, cotton, flax or of other renewable raw materials. In particular using secondary fibres, regenerated fibres or recycled fibres expands the range of applications of the installation 1 for producing a biodegradable web, which cannot be achieved with an air laid or meltblown installation. Also in this exemplary embodiment, the distance L amounts to 25 m maximum between the points of depositing, at which the webs 12a and 14a are placed on one or more belt/s 3, and between which the layer of wet laid fibres 24 is applied. The distance I amounts to 10 m maximum between the point of depositing a web 12a on one or more belt/s 3 and the following point of depositing in transport direction, at which the wet laid fibres 24 are placed on the web 12a. Thus, creating a short and compact installation, which cannot be achieved when using a traditional inclined wire former. Another advantage is found in that the installation can be operated with only one layer of wet laid fibres 24, or with two layers (12a and 24) or (24 and 14a) or with three layers (12a and 24 and 14a) of fibres or webs, and the compactness thereof and low investment cost allow for a very affordable operation.

Compared to an air laid method, the cylinder mould former 20 is advantageous in that the wet laid fibres 24 can be further processed with two smooth or planar surfaces, which are smoothed by the cylinder 22 on the wire side and by the belt 21 on the top side of the wet laid fibres 24. Based on the smoothed surfaces, in particular with light and thin wet laid fibres, is achieved a very uniform material distribution or a very uniform weight per unit area, which cannot be achieved with other methods (air laid, meltblown). Compared to the traditional inclined wire former, the advantage of the cylinder mould former 20 is the compactness and the low investment and operating cost.

Figure 4:
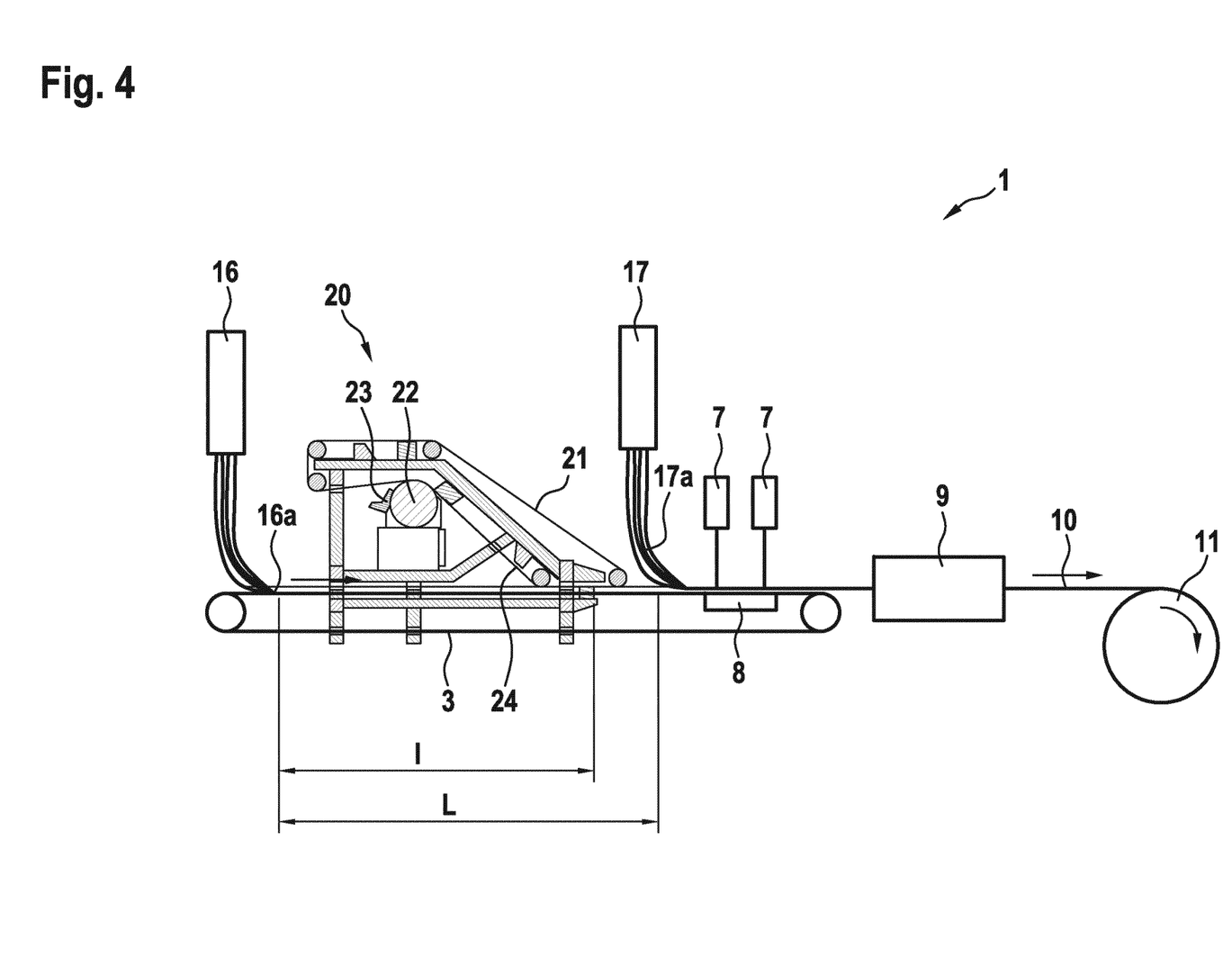
FIG. 4: another exemplary embodiment of an inventive installation.

The alternative embodiment of the installation according to FIG. 4 shows another alternative embodiment, in which, instead of the roller card 2 and/or 6 of FIG. 1 and/or the unwind stations 12 and/or 14 of FIG. 3, at least one web 16a or 17a of synthetic endless filaments can be doffed off at least one spunbond installation 16, 17 or spunlace turret and introduced into the installation 1. For example, the web 16a, 17a can have a respective weight per unit area of 15 g/m². For a pulp quantity of 20 g/m², which the cylinder mould former 20 processes, is achieved a light multilayer web 10 of altogether 50 g/m² after the dryer 9. The web 10 with a layer of wet laid fibres 24 from pulp can have a high water-retention capability and thereby preferably be used for hygienics or cosmetics.

Also in this exemplary embodiment, the distance L amounts to 25 m maximum between the points of depositing, at which the webs 16a and 17a are placed on one or more belt/s 3, and between which the layer of wet laid fibres 24 is applied. The distance I amounts to 10 m maximum between the point of depositing a web 16a on one or more belt/s 3 and the following point of depositing in transport direction, at which the wet laid fibres 24 are placed on the web 16a. Thus creating a short and compact installation, which cannot be achieved when using a traditional inclined wire former. Another advantage is found in that the installation can be operated with only one layer of wet laid fibres 24, or with two layers (16a and 24) or (24 and 17a) or with three layers (16a and 24 and 17a) of fibres or webs, and the compactness thereof and low investment cost allow for a very affordable operation.

Figure 5:
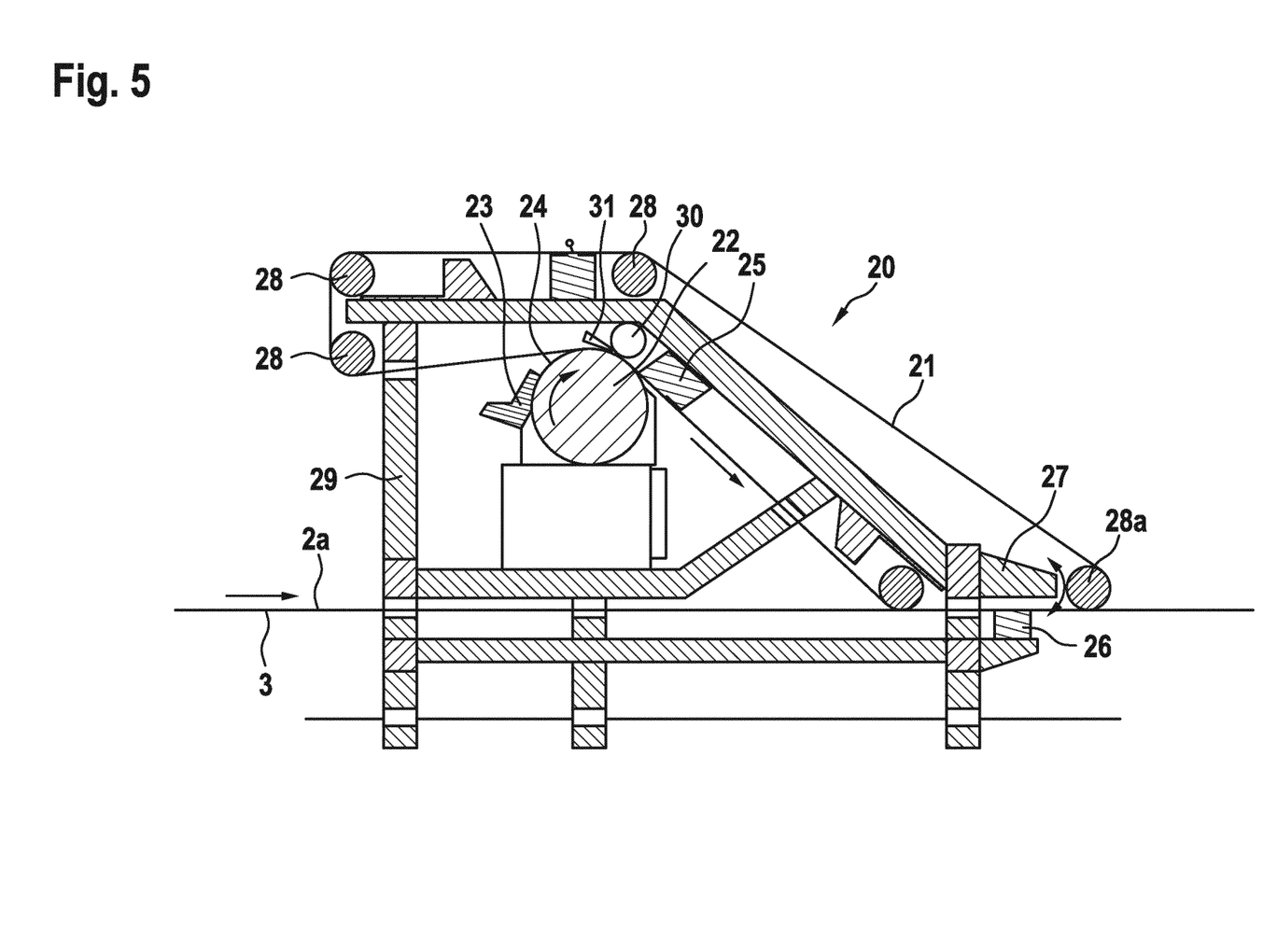
FIG. 5: another exemplary embodiment of a cylinder mould former.

The exemplary embodiment of FIG. 5 differs from the exemplary embodiment of FIG. 2 in the arrangement of the couch roll 30 in transport direction upstream the doffer, so that compacting and dewatering is realized upstream the doffer 25, with which the wet laid fibres 24 are taken over from the cylinder to the belt 21. In addition, upstream the couch roll 30, a suction device 31 is disposed, which independently of the construction type of the cylinder 22 (suctioned or not on the inside) is able to suction water from the fibre suspension. The swivelable arrangement of the deflection roller 28a allows for setting an angle between the belt 21 and the belt 3, which facilitates the transfer of the wet laid fibres 24 to the web 2a or directly to the circulating belt 3. Additionally, the tension of the belt 21 can be set via the deflection roller 28a.

The embodiments of the cylinder mould former 20 according to the FIGS. 1 to 6 are in particular advantageous for incorporation between two roller card installations 2, 6 or between two unwind stations 12, 14 or between two spunbond installations 16, 17 or in any optional combination of the installation components (roller card, unwind station, spunbond), in which low space requirement is advantageous. In this case, a web 2a, 12a, 16a can be guided through underneath the cylinder mould former 20, wherein the wet laid fibres 24 of the cylinder mould former 20 can be deposited on said web 2a, 12a, 16a.

Figure 6:
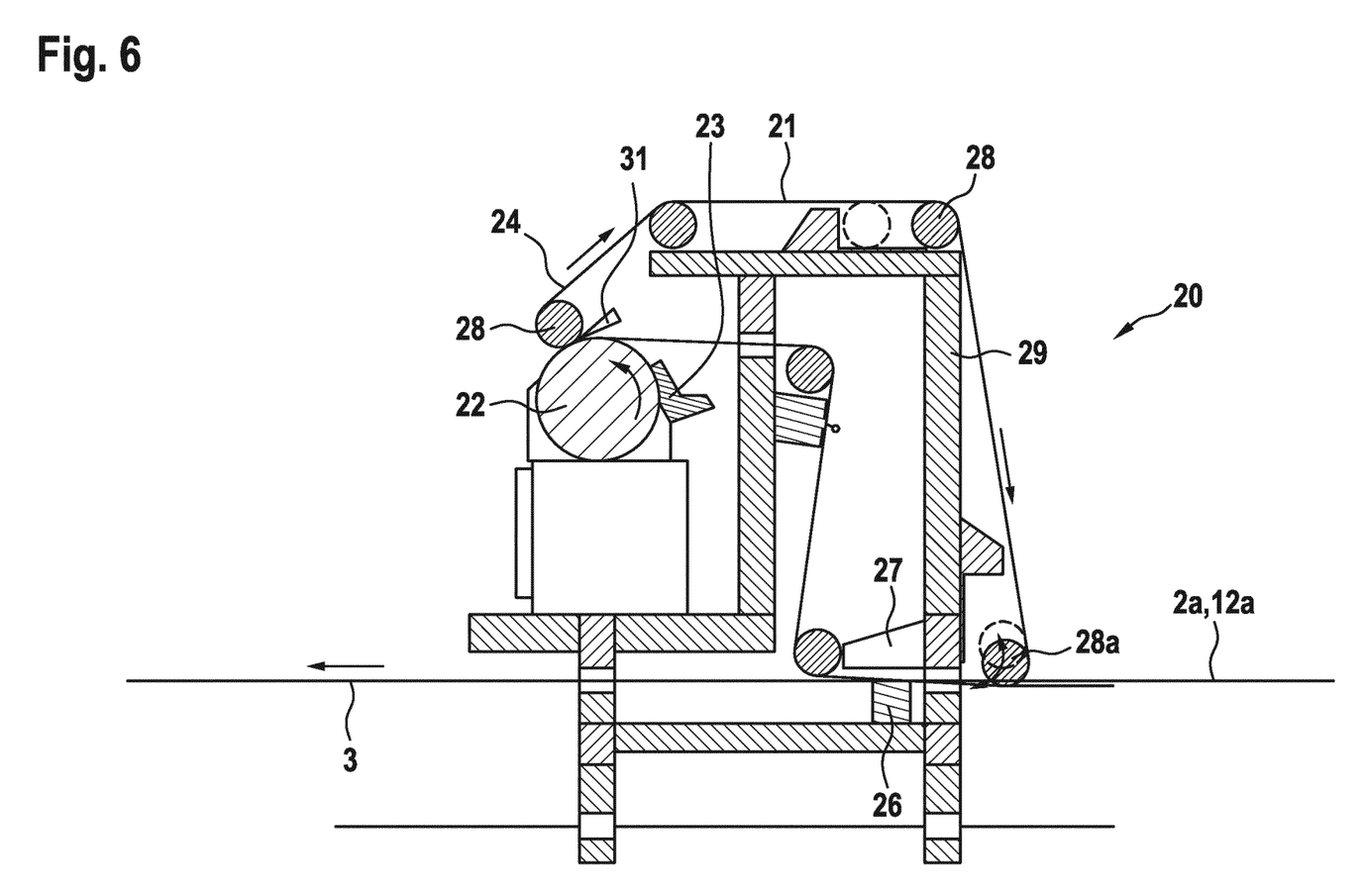
FIG. 6: another exemplary embodiment of a cylinder mould former.

FIG. 6 shows an alternative embodiment of a cylinder mould former 20 in another viewing direction or lateral view, in which the belt 3 with the web 2a is transported from the right to the left (transport direction). This embodiment has a very compact construction, because the belt 21 of the cylinder mould former 20 is mainly vertically disposed. The headbox 23 deposits a fibre suspension on a driven rotating cylinder 22. Preferably, the cylinder 22 can have a perforated jacket and thereby evacuate the water of the fibre suspension. For this purpose, the entire cylinder 22 can be at slight negative pressure and have a drain for the evacuated water. Complementarily, the cylinder 22 can be also suctioned at least in the partial area on the circumference, on which the belt 21 rests. The circulating belt 21, which can be formed as a perforated belt, is guided around several deflection rollers 28 and, with an outer side, with tension rests on a partial circumference of the cylinder 22, so that the water is pressed out of the fibre suspension. A suction 31 in the shape of a beak-type suction suctions at least a portion of the liquid through the circulating belt 21. Instead of a couch roll of FIG. 5, a deflection roller 28 transports the belt 21 with the wet laid fibres 24 from an upside-down position to an oblique resting position. The deflection roller 28 can be formed by means of the adjusting device so that simultaneously compacting and further dewatering are realized in the area of the deflection of the wet laid fibres. At least one deflection roller 28a can be embodied as a tensioning roller, which is able to tension the circulating belt 21. Preferably, the cylinder 22 and the belt 21 rotate or move at the same speed. Thereby, the fibres 24 are transported upside-down with the top side thereof from the belt 21 in the direction deflection roller 28 so that the wet laid fibres 24 with the wire side thereof are rotated by almost 180° upwards. With a further deflection roller 28, the fibres 24 are transported almost vertically downwards and, in the area of an adjustable or swiveable deflection roller 28a, are deposited on a circulating belt 3 or a web 2a, 12a. A belt 3 allows for guiding the web 2a, 12a completely underneath the rack 29 of the cylinder mould former 20. In the area of the transfer of the fibres 24 to the web 2a, at the cylinder mould former 20 can be disposed a suction separator 26, which detaches the fibres from the belt 21. In this case, the suction separator 26 is disposed underneath the circulating belt 3 and can thereby simultaneously blow air through the web 2a, 12a. A pressure device 27 can be disposed on the opposite side of the belt 21, namely on the inside of the belt 21, for increasing the detaching effect of the fibres 24 from the belt 21, which device detaches the fibres 24 from the belt 21 by means of air or water pressure. Preferably, a deflection roller 28a is formed for being adjusted in position so that an open angle is created in the transfer area of the wet laid fibres 24 on the web 2a between the belts 3 and 21 in transport direction, which angle assists in detaching the wet laid fibres 24 from the belt 21. The ability of swivelling of the deflection roller 28a simultaneously facilitates guiding through the web 2a, 12a, 16a underneath the cylinder mould former.

Figure 7:
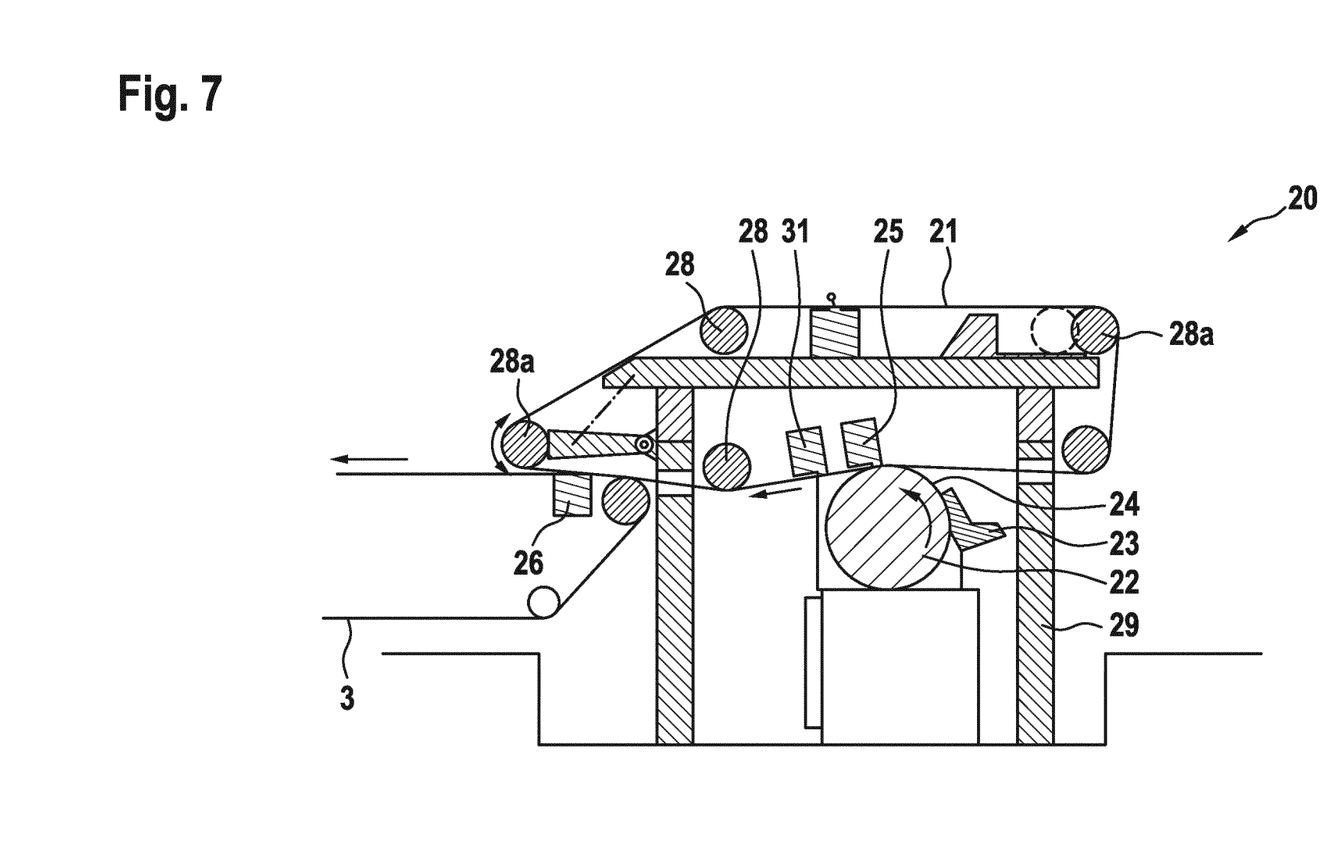
FIG. 7: another exemplary embodiment of a cylinder mould former.

FIG. 7 shows a further embodiment of a cylinder mould former 20 with another viewing direction or lateral view, in which the cylinder mould former 20 is disposed in transport direction of the wet laid fibres 24 upstream a circulating belt 3. By way of example, said arrangement is at least partially disposed underfloor, so that the wet laid fibres 24, which the cylinder mould former 20 produced, can be almost horizontally transported to a circulating belt 3. The headbox 23 deposits a fibre suspension on a driven rotating cylinder 22. Preferably, the cylinder 22 can have a perforated jacket and thereby evacuate the water of the fibre suspension. For this purpose, the entire cylinder 22 can be at slight negative pressure and have a drain for the evacuated water. Complementarily, the cylinder 22 can be also suctioned at least in the partial area on the circumference, on which the belt 21 rests. The circulating belt 21, which can be formed as a perforated belt, is guided around several deflection rollers 28 and, with an outer side, with tension rests on a partial circumference of the cylinder 22, so that the water is pressed out of the fibre suspension. A doffer 25 and a following suction 31 are formed for doffing off the wet laid fibres 24 from the cylinder 22 and for keeping them with the top side of the wet laid fibres 24 at the belt 21. In this case, at least a portion of the liquid can be suctioned through the circulating belt 21. A further deflection roller 28 is formed for deflecting the belt 21 such that, by means of another deflection roller of the circulating belt 3, is realized a slight compacting of the wet laid fibres 24. In the transfer area of the wet laid fibres from the belt 21 to the circulating belt 3, a suction separator 26 can be disposed, with which the wet laid fibres 24 with the underside thereof are deposited on the belt 3. Preferably, a deflection roller 28a is formed for being adjusted in position so that an open angle is created in the transfer area of the wet laid fibres 24 to the belt 3 between the belts 3 and 21 in transport direction, which angle assists in detaching the wet laid fibres 24 from the belt 21. Not illustrated in transport direction, at least one web 2a, 6a, 12a, 14a, 16a, 17a can be fed from underneath or above the belt 3, for being entangled with the wet laid fibres 24 by means of hydroentangling.

All embodiment variants of the cylinder mould former can be combined with each other optionally according to the application cases. The cylinder mould former 20 is suitable for a mass per unit area of 10 to 50 g/m². The working speed can be from 50 to 400 m/min. The maximum working width can be up to 5 m. For all application cases of FIGS. 1 to 7, the subsequent entangling of the one layer of wet laid fibres 24 or several web layers to the wet laid fibres 24 can be realized with one or more beam/s of a hydroentangling 7 at a pressure of 40 to 400 bars.

According to an embodiment, the layer of wet laid fibres can consist of at least partially short synthetic fibres having a fibre length of 1 to 3 mm, preferably of 1 to 12 mm, such as polyester, polyamide, polypropylene or polyolefin. Also, fibre blends of synthetic and natural fibres are possible. Likewise, the layer of wet laid fibres can consist of 100% pulp or other natural fibres, which have a high water-retention capacity, and preferably are biodegradable. Using secondary fibres, recycled fibres or regenerated fibres is advantageous for producing biodegradable fibres.

The fibre suspension can consist of a blend of fibres having a high content of pulp and a smaller content of short synthetic fibres with a fibre length of 1 to 3 mm, preferably of 1 to 12 mm, such as polyester, polyamide, polyolefin, polypropylene or viscose or lyocell. Preferably, the weight per unit area of the dried web 10 can be 20 to 70 g/m².

Depending on the embodiment, the web 12a, 14a can consist for example of polyester, viscose, a cotton blend or a blend of synthetic and/or natural fibres, for example also one or both webs 12a, 14a made from tissue or paper can be used. Preferably, the weight per unit area of the web 10 is between 20 to 70 g/m². The fibres of the webs 12a, 14a can consist of short fibres, for example staple fibres having a length of 3 to 60 mm, or of synthetic endless filaments.

According to another embodiment a very compact and flexible installation for producing a single-layer or multi-layer web 10, which can consist of only the layer of wet laid fibres 24 or only of a carded web 2a with or without the carded web 6a. As an alternative, the web 10 can consist of two or more layers, for example of the wet laid fibres 24 with one or two webs 2a, 6a of the roller cards 2 and/or 6 or of the wet laid fibres 24 with the webs 12a and/or 14a and/or another web 16a and/or 17a of a spunbond installation 16 and/or 17.

The invention claimed is:

1. An installation for producing a multi-layer nonwoven, comprising:
    a cylinder mould former for producing a layer of wet laid fibres including:
        a rotating cylinder having an outer surface;
        a headbox formed for depositing a fibre suspension on the outer surface of the rotating cylinder with a top side of the fibre suspension extending away from the outer surface of the rotating, cylinder;
        a circulating belt having an outer surface arranged along a circular portion of the rotating cylinder for compacting the fibre suspension at the rotating cylinder to create a layer of wet laid fibres with a smooth underside on the rotating cylinder; and
        a doffer with a suction chamber arranged inside the circulating belt in an area where the circulating belt separates from the rotating cylinder and travels in a downward direction toward an installation circulating belt travelling essentially in a horizontal direction and carrying a nonwoven layer;
    wherein the top side of the fibre suspension remains attached to the outer surface of the circulating belt due to suction of the doffer so that the layer of wet laid fibre suspension is transported upside-down from the rotating cylinder for being deposited with its smooth underside onto the nonwoven layer carried by the installation circulating belt;
    an entangling device following the cylinder mould former in the material transport direction; and
    at least one dryer disposed downstream in the material transport direction from the entangling device.

2. The installation for producing multi-layer nonwoven according to claim 1, wherein the rotating cylinder includes a suction device.

3. The installation for producing a multi-layer nonwoven according to claim 1, wherein one of the rotating cylinder and the circulating belt cooperate with at least one of a couch roll and overhead suction.

4. The installation for producing a multi-layer nonwoven according to claim 1, further comprising the installation circulating belt, wherein the wet laid fibres on the circulating belt of the cylinder mould former are deposited on the installation circulating belt, wherein, in an area of a transfer of the wet laid fibres to the installation circulating belt, the cylinder mould former includes at least one of a suction separator and a pressure device.

5. The installation for producing a multi-layer nonwoven according to claim 1, further including a plurality of deflection rollers arranged to support the circulating belt of the cylinder mould former, and including at least one deflection roller in an area of a transfer of the wet laid fibres to the installation circulating belt, and said at least one deflection roller is disposed to be at least one of swivelable and adjustable.

6. The installation for producing a multi-layer nonwoven according to claim 1, wherein the cylinder mould former includes a dilution water regulator.

7. The installation for producing a multi-layer nonwoven according to claim 1, wherein the headbox of the cylinder mould former includes headbox heating.

8. The installation for producing a multi-layer nonwoven according to claim 1, wherein the cylinder mould former includes lateral suctioning.

9. The installation for producing a multi-layer nonwoven according to claim 1, wherein the cylinder mould former rests on a floor and includes a rack which is either formed for being mounted at least partially under the floor or includes a free space for passage of the installation circulating belt.

10. The installation for producing a multi-layer nonwoven according to claim 1, further including at least one further device formed for introducing a further web into the installation.

11. The installation for producing a multi-layer nonwoven according to claim 10, wherein the further device comprises at least one of a roller card, an unwind station, and a spunbond installation.

* * * * *